(12) United States Patent
Bavishi et al.

(10) Patent No.: US 10,733,075 B2
(45) Date of Patent: Aug. 4, 2020

(54) DATA-DRIVEN SYNTHESIS OF FIX PATTERNS

(71) Applicant: FUJITSU LIMITED, Kawasaki-shi, Kanagawa (JP)

(72) Inventors: Rohan Bavishi, Berkeley, CA (US);
Hiroaki Yoshida, Cupertino, CA (US);
Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 41 days.

(21) Appl. No.: 16/109,434

(22) Filed: Aug. 22, 2018

(65) Prior Publication Data
US 2020/0065219 A1 Feb. 27, 2020

(51) Int. Cl.
*G06F 11/36* (2006.01)
*G06F 8/30* (2018.01)

(52) U.S. Cl.
CPC .......... *G06F 11/3608* (2013.01); *G06F 8/30* (2013.01)

(58) Field of Classification Search
CPC .................................. G06F 11/3608
USPC ....................................... 717/125
See application file for complete search history.

(56) References Cited

U.S. PATENT DOCUMENTS

| | | | | |
|---|---|---|---|---|
| 6,149,318 A * | 11/2000 | Chase | ............ | G06F 8/437 |
| | | | | 714/E11.209 |
| 6,594,783 B1 * | 7/2003 | Dollin | ............ | G06F 8/427 |
| | | | | 714/38.14 |
| 7,340,726 B1 * | 3/2008 | Chelf | ............ | G06F 8/71 |
| | | | | 714/38.12 |
| 7,607,066 B2 * | 10/2009 | Gertz | ............ | H03M 13/47 |
| | | | | 714/723 |
| 8,312,427 B2 * | 11/2012 | Hutchison | ............ | G06F 8/751 |
| | | | | 717/110 |
| 9,383,973 B2 * | 7/2016 | Villar | ............ | G06F 8/33 |
| 9,459,848 B1 * | 10/2016 | Horie | ............ | G06F 8/427 |
| 9,996,328 B1 * | 6/2018 | Kluss | ............ | G06F 9/4498 |
| 10,379,825 B2 * | 8/2019 | Berg | ............ | G06F 8/433 |

(Continued)

OTHER PUBLICATIONS

Miltiadis Allamanis and Charles Sutton, "Mining idioms from source code," In Proceedings of the 22nd ACM SIGSOFT International Symposium on Foundations of Software Engineering (FSE, Apr. 1, 2014).

(Continued)

*Primary Examiner* — Francisco J Aponte
(74) *Attorney, Agent, or Firm* — Maschoff Brennan

(57) ABSTRACT

Operations may include identifying an edit that corresponds to a fault of a program. The edit may be identified based on a difference between the program and an improved program. The operations may include obtaining an AST that represents the program and includes defect nodes that correspond to a fault location and include an edit node. The operations may include classifying a particular node as a primary node that operates as a starting point for the edit. The operations may include identifying a path from the primary node to the edit node. The operations may include generating a fix pattern based on the path and the edit. The operations may include performing repairs with respect to an identified fault of code. The repairs may be performed using the fix pattern and based on the identified fault of the code being the same type as the fault of the program.

17 Claims, 6 Drawing Sheets

(56) References Cited

U.S. PATENT DOCUMENTS

| | | | | | |
|---|---|---|---|---|---|
| 2005/0015752 | A1* | 1/2005 | Alpern | ................ | G06F 11/3604 717/131 |
| 2007/0006170 | A1* | 1/2007 | Hasse | ................... | G06F 11/366 717/131 |
| 2007/0168946 | A1* | 7/2007 | Drissi | ...................... | G06F 8/36 717/110 |
| 2007/0169020 | A1* | 7/2007 | Kondoh | .................... | G06F 8/73 717/136 |
| 2007/0277163 | A1* | 11/2007 | Avresky | .................... | G06F 8/43 717/140 |
| 2009/0307664 | A1* | 12/2009 | Huuck | ................ | G06F 11/3608 717/124 |
| 2010/0153933 | A1* | 6/2010 | Bohlmann | ................ | G06F 8/43 717/144 |
| 2012/0311546 | A1* | 12/2012 | Fanning | ................... | G06F 8/49 717/136 |
| 2014/0165028 | A1* | 6/2014 | Balasubramanian | ..... | G06F 8/33 717/109 |
| 2015/0082276 | A1* | 3/2015 | Balachandran | ........... | G06F 8/30 717/112 |
| 2015/0128114 | A1* | 5/2015 | O'Hara | ..................... | G06F 8/71 717/143 |
| 2016/0034367 | A1* | 2/2016 | Kopetz | .................... | G05B 9/03 714/11 |
| 2016/0132300 | A1* | 5/2016 | Bernelas | ................ | G06F 8/427 717/109 |
| 2019/0138731 | A1* | 5/2019 | Tan | ........................ | G06N 7/005 |
| 2019/0278572 | A1* | 9/2019 | Yoshida | ................. | G06F 8/427 |

OTHER PUBLICATIONS

R. Rolim et al., "Learning Syntactic Program Transformations from Examples," ICSE May 20, 2017.

K. Liu et al., "Mining Fix Patterns for FindBugs Violations," arXiv:1712.03201 [cs.SE], Dec. 8, 2017.

R. van Tonder and C. Le Goues, "Static Automated Program Repair for Heap Properties," ICSE Jul. 15, 2018.

* cited by examiner

DATA-DRIVEN SYNTHESIS OF FIX PATTERNS

FIELD

The embodiments discussed in the present disclosure are related to data-driven synthesis of fix patterns.

BACKGROUND

Software programs often have faults in them (commonly referred to as "bugs") in which they may not operate as intended. Often static analysis tools are used to identify faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include identifying an edit operation. The edit operation may correspond to a fault of a defective software program. The edit operation may be identified based on one or more differences between the defective software program and an improved software program. The improved software program may include the edit operation as a repair of the fault. The method may also include obtaining a defect abstract syntax tree (AST). The defect AST may represent the defective software program. The defect AST may include multiple defect nodes. The multiple defect nodes may correspond to a fault location of the defective software program that includes the fault. The multiple defect nodes may include an edit node that is changed by the edit operation. Additionally, the method may include classifying a particular node of the multiple defect nodes as a primary node. The primary node may operate as a starting point in implementing the edit operation. The method may further include identifying a visitor path from the primary node to the edit node. The visitor path may be included in a visitor AST. The visitor AST may correspond to the defect AST. The visitor path may include a sequence of one or more visitor edges that indicate a programmatic relationship between the primary node and the edit node. The method may include generating a fix pattern. The fix pattern may be based on the visitor path and the edit operation. Additionally, the fix pattern may be generated in a format compatible with a source code of the defective software program. The method may also include performing repair operations. The repair operations may be performed with respect to an identified fault of code under test of an analyzed software program. The repair operations may also be performed using the fix pattern. Additionally, the repair operations may be performed based on the identified fault of the code under test being of a same type as the fault of the defective software program.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
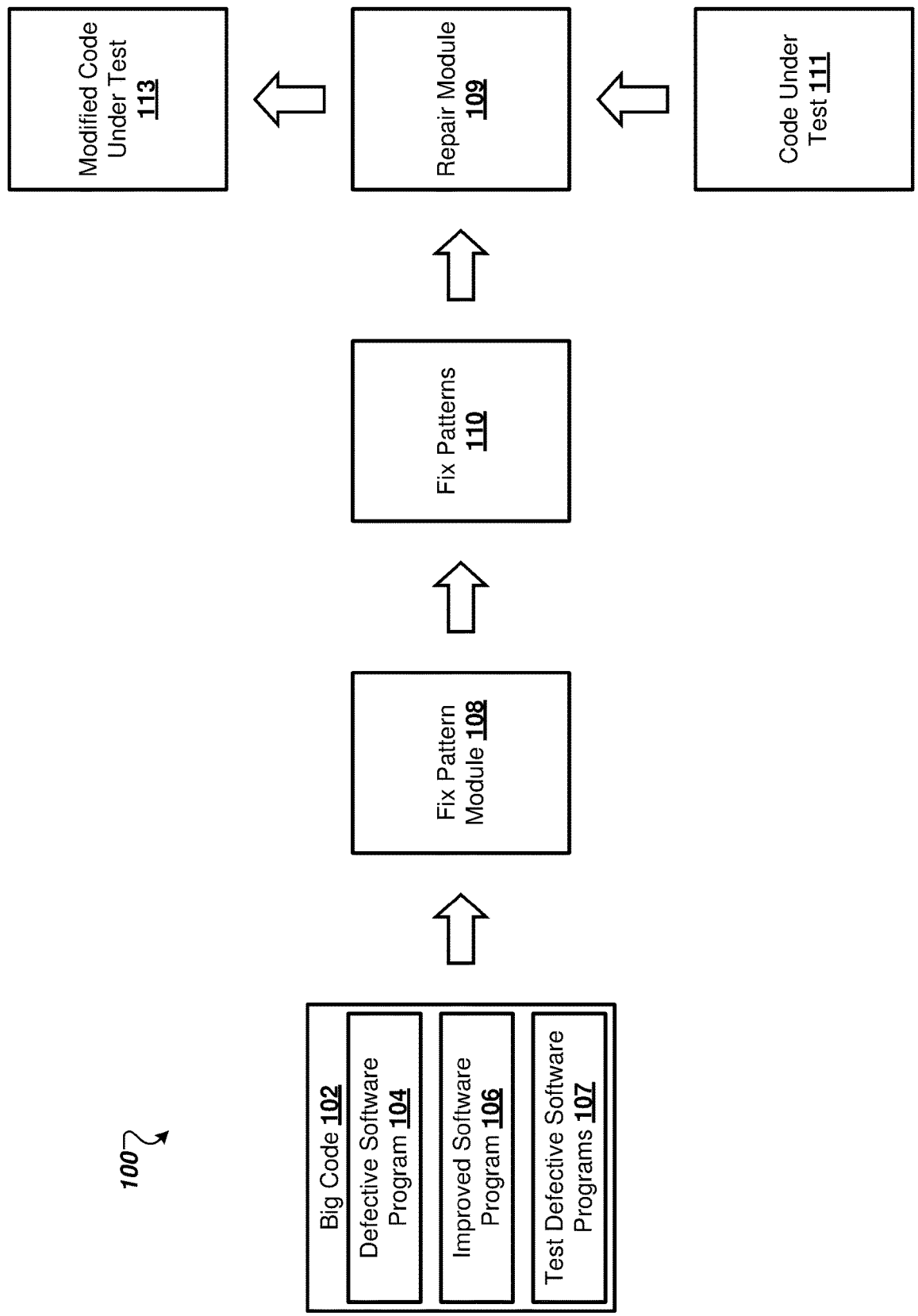
FIG. 1 is a diagram representing an example environment related to generating fix patterns that may be used to perform repair operations of a software program.

Some embodiments described in the present disclosure relate to data-driven synthesis of fix patterns. Software programs often include faults (also commonly referred to as "bugs") that may cause the software programs to behave in an unintended manner. Additionally, static analysis systems and techniques are often used to detect faults in software programs. Example static analyzers may include but are not limited to PMD, Coverity, Coverity Scan, Facebook Infer, Google error-prone, SonarQube, and FindBugs (SpotBugs).

Static analysis systems and techniques may not require a test suite to identify faults in the software programs. In contrast, dynamic systems and techniques may require a test suite to identify faults in the software programs. Static analysis systems and techniques may identify various software quality issues (e.g., violations and/or bugs) in software programs under test. For example, static analysis systems and techniques may identify stylistic violations, common software weaknesses, security vulnerabilities, and/or other style guidelines violations in the software programs. When a violation has been identified, the static analysis systems and techniques may flag defective domain specific language (DSL) (e.g., suspicious code) associated with the violation. These reported violations may impact performance and/or correctness of operation of the software programs.

The reported violations may be large in number (e.g., a high volume of reported violations). Additionally, the reported violations may be non-critical to functionality of the software programs. Due to the typically large number of reported violations and sometimes non-critical impact to functionality of the software programs, the reported violations may often be ignored and not corrected (e.g., repaired). This may be due to that fact that the amount of time to manually repair the DSL associated with the violations may outweigh the gain in functionality of the software programs. This may cause unintended results and/or reduced performance of the operation of the software program during use, which may require time after developing the software programs to address user complaints.

For example, over 1.1 million violations were reported in over four thousand six hundred open source software (OSS) projects. Of these 1.1 million reported violations, approximately six hundred thousand were addressed (e.g., repairs were made to the corresponding DSL). Additionally, software developers may spend roughly fifty percent of their time finding and repairing reported violations, which can add roughly six months to a project.

Manually addressing the reported violations by manually generating fix patterns may require a large number of training examples. The manually generated fix patterns may be DSL patterns that include replacement code and not steps describing fixes for existing DSL. Additionally, some manually generated fix patterns may include simple steps for fixing existing DSL (e.g., the DSL in the manually generated fix patterns may be based on simple structural pattern matching). Furthermore, the manually generated fix patterns may describe the modifications to the DSL in the software programs in natural language and not in DSL. In addition, the manually generated fix patterns may be manually predefined by software developers requiring significant time to generate.

One or more embodiments described in the present disclosure may provide automated systems and techniques for generating fix pattern (e.g., patches) that may be applied to real world DSL projects to address the large number of reported violations in a manner that may reduce delay in development of software programs as compared to manually generating fix patterns. Fix patterns may identify one or more edit operations (e.g., repair patterns) with respect to one or more identified faults (e.g., violations) in defective software programs. Additionally, fix patterns may generalize and represent the edit operations as repairs (e.g., fixes) and/or improvements that may be made to the DSL associated with defective software programs. Furthermore, fix patterns may be generated in the DSL and/or a format that is compatible with the DSL of the defective software programs.

The embodiments described in the present disclosure may learn generalized executable fix patterns using a program synthesis algorithm. Additionally, the embodiments described in the present disclosure may generate a database of fix patterns which may then be applied to new and/or unseen violations in DSL.

One or more embodiments described in the present disclosure may include a fix pattern module that may perform programming by example based fix pattern generation. The fix pattern module may receive one or more defective software programs from a big code source. The fix pattern module may identify one or more edit operations with respect to one or more faults that are identified in the defective software program. Additionally, the fix pattern module may receive one or more improved software programs that correspond to the defective software programs and that include the edit operations as a repair of the faults in the defective software programs.

In some embodiments, the fix pattern module may obtain one or more defect abstract syntax trees (AST). The defect ASTs may represent the defective software programs. The defect ASTs may include one or more defect nodes that correspond to fault locations of the defective software programs. One or more of the defect nodes in each defect AST may be identified as an edit node that is changed by the edit operations. Additionally, one or more of the edit nodes in each defect AST may be classified as a primary node. Each primary node may operate as a starting point in implementing the edit operation.

In these and other embodiments, the fix pattern module may obtain and/or generate visitor ASTs that correspond to each of the defect AST. The fix pattern module may use the visitor ASTs to identify visitor paths from the primary nodes to the edit nodes. Furthermore, the fix pattern module may generate fix patterns in DSL based on the visitor paths and the edit operations.

In some embodiments, a repair module may receive the fix patterns and code under test. The repair module may perform repair operations on the code under test using the fix patterns and based on one or more faults in the code under test being the same or similar to one or more faults in the defective software programs.

Embodiments of the present disclosure are explained with reference to the accompanying drawings.

FIG. 1 is a diagram representing an example environment 100 related to generating fix patterns 110 that may be used to perform repair operations of a software program. The environment 100 may include a fix pattern module 108 configured to generalize and represent repairs (e.g., fixes) that were made to source code of a defective software program 104 to obtain an improved software program 106 that are obtained from a big code 102. The fix pattern module 108 may also be configured to output the fix patterns 110, which may include repair patterns represented in source code that indicate repairs that may be used to repair and/or improve similar faults in different defective software programs. The fix patterns 110 may identify one or more edit operations (e.g., repair patterns) with respect to one or more identified faults (e.g., violations) in the defective software program 104. Additionally, the fix patterns 110 may generalize and represent the edit operations as repairs (e.g., fixes) and/or improvements that may be made to the DSL associated with the defective software program 104. Furthermore, the fix patterns 110 may be generated in the DSL and/or a format that is compatible with the DSL of the defective software program 104.

Additionally, the environment 100 may include a repair module 109 configured to analyze a code under test 111 (e.g., different defective software programs) for faults. The repair module 109 may also be configured to output modified code under test 113, which may include one or more modifications made to the code under test 111 by the repair module 109 based on the fix patterns 110.

The code under test 111 may include electronic data, such as, for example, a software program, code of the software program, libraries, applications, scripts, or other logic or instructions for execution by a processing device (e.g., the repair module 109). In some embodiments, the code under test 111 may include a complete instance of the software program. Additionally or alternatively, the code under test 111 may include a portion of the software program. The code under test 111 may be written in any suitable type of computer language that may be used for the software program and for static analysis.

The repair module 109 may include code and routines configured to enable a computing device to perform one or more modifications of the code under test 111 to generate the modified code under test 113. Additionally or alternatively, the repair module 109 may be implemented using hardware including a processor, a microprocessor (e.g., to perform or control performance of one or more operations), a field-programmable gate array (FPGA), or an application-specific integrated circuit (ASIC). In some other instances, the repair module 109 may be implemented using a combination of hardware and software. In the present disclosure, operations described as being performed by the repair module 109*b* may include operations that the repair module 109 may direct a corresponding system to perform.

The repair module 109 may be configured to perform a series of edit operations with respect to the code under test 111 that may be used to repair (also referred to in the present disclosure as correct) one or more faults in the code under test 111 as discussed in more detail below. In some embodiments, the repair module 109 may be configured to perform one or more of the edit operations based on the fix patterns 110. In some embodiments, the fix patterns 110 may be used by the repair module 109 to repair unseen complex, and/or other faults in the code under test 111 discovered by static program analysis or any other appropriate type of program analysis of the code under test 111.

The big code 102 may include the defective software program 104, the improved software program 106, and multiple test defective software programs 107. The big code 102 may include electronic data, such as, for example, the defective software program 104, the improved software program 106, the test defective software programs 107, source code of the various software programs, libraries, applications, scripts, or other logic or instructions for execution by a processing device. In some embodiments, the big code 102 may include a complete instance of the defective software program 104, the improved software program 106, and/or the test defective software programs 107. Additionally or alternatively, the big code 102 may include a portion of the defective software program 104, the improved software program 106, and/or the test defective software programs 107. The code under test 111 may be written in any suitable type of computer language that may be used for the software program and for static analysis. For example, the defective software program 104, the improved software program 106, and/or the test defective software programs 107 may be written in DSL which may be analyzable by a static analyzer. In some embodiments, the defective software program 104, the improved software program 106, and the test defective software programs 107 may be written in the same type or a compatible type of DSL as the code under test 111.

In some embodiments, the big code 102 may include existing code that has been obtained from any appropriate source. For example, the big code 102 may include code that has been uploaded by program developers. The defective software program 104, the improved software program 106, and/or the test defective software programs 107 may be used to repair faults in the different software programs (e.g., the code under test 111). In some embodiments, the defective software program 104, the improved software program 106, and the test defective software programs 107 may be stored in the big code 102 in a machine readable DSL. Additionally or alternatively, the defective software program 104, the improved software program 106, and the test defective software programs 107 may be stored in the big code 102 in a human readable format.

The defective software program 104 may be a software program that includes one or more faults that have been identified by a static analyzer (not illustrated). In some embodiments, a static analyzer may analyze the defective software program 104 to identify one or more faults in the DSL of the defective software program 104. In some embodiments, the static analysis may be performed prior to the defective software program 104 being stored in the big code 102. In other embodiments, the defective software program 104 may be labelled as defective when stored in the big code 102 and the fix pattern module 108 may perform the static analysis of the defective software program 104.

In some embodiments, the faults in the defective software program 104 may include one or more syntax violation and/or semantic violation in the DSL of the defective software program 104. In these and other embodiments, identification of the faults in the defective software program 104 may identify fault locations of the faults in one or more lines of the DSL (e.g., a line of source code) in the defective software program 104 that correspond to the respective faults.

The improved software program 106 may be a software program that is related to the defective software program 104. For example, the improved software program 106 may perform the same or similar operations as the defective software program 104 except that one or more faults have been repaired in the improved software program 106. For example, each line of DSL in the improved software program 106 may be the same or similar to the lines of DSL in the defective software program 104 except the one or more lines of the DSL of the defective software program that include the faults.

In some embodiments, the faults in the defective software program 104 may be corrected in the improved software program 106 by performing one or more edit operations with respect to the faults. The edit operations may include one or more edits that may be made to the defective software program 104 at the fault locations to repair the respective faults such that the improved software program 106 may include a corresponding edit operation as a repair of a respective fault. An edit operation that corresponds to a particular fault may be based on the one or more edits that may be performed to correct the particular fault. The edit operations may include insertion of new DSL, revisions of existing DSL, or rearrangement of the existing DSL. The defective software program 104 and the improved software program 106 may be used to identify the edit operations and corresponding edits that were made to the DSL of the defective software program 104 to obtain the DSL of the improved software program 106.

The fix pattern module 108 may include code and routines configured to enable a computing device to generalize and represent the edit operations that were made to the DSL of the defective software program 104 to obtain the DSL of the improved software program 106. Additionally or alternatively, the fix pattern module 108 may be implemented using hardware including a processor, a microprocessor (e.g., to perform or control performance of one or more operations), a field-programmable gate array (FPGA), or an application-specific integrated circuit (ASIC). In some other instances, the fix pattern module 108 may be implemented using a combination of hardware and software. In the present disclosure, operations described as being performed by the fix pattern module 108 may include operations that fix pattern module 108 may direct a corresponding system to perform.

The fix pattern module 108 may be configured to perform a series of operations with respect to the defective software program 104, the improved software program 106, and/or the test defective software programs 107 that may be used to generalize and represent the edit operations that were made to the DSL of the defective software program 104 to obtain the DSL of the improved software program 106. Additionally, the fix pattern module 108 may generate the fix patterns 110 as discussed in more detail below. In some embodiments, the fix pattern module 108 may generate the fix patterns 110 based on a single pair of the defective software program 104 and the improved software program 106. In other embodiments, the fix pattern module 108 may generate the fix patterns 110 based on multiple pairs of the defective software programs 104 and the improved software programs 106.

For example, the fix pattern module 108 may be used to generate a fix patterns 110 that represents edit operations made to a string software routine (referred to herein as "the string example"). In the string example, the defective source code in an example DSL may be:

String message="required artifacts missing:\n";
for (Artifact missingArtifact:missingArtifacts)
{
message+=" " +missingArtifact.getId( )+"\n";
}
message+="\nfor the artifact";
(throw new ArtifactResolutionException(message, project.getArtifact( ) project.getRemoteArtifactRepositories( ));

Additionally, in the string example, the improved source code in the example DSL may be:

StringBuffer message=new StringBuffer("required artifacts missing:\n");
for (Artifact missingArtifact:missingArtifacts)
{
message.append(" ").append(missingArtifact.getId( )).append('\n')
}
message.append("\nfor the artifact:"); throw new ArtifactResolutionException(
message.to String( ), project.getArtifact( ), project.getRemoteArtifactRepositories( ));

In some embodiments, the fix pattern module 108 may obtain the defective software program 104 and the improved software program 106 from the big code 102. In these and other embodiments, the fix pattern module 108 may identify an edit operation with respect to a particular fault in the defective software program 104 that was made to obtain the improved software program 106. Additionally or alternatively, the fix pattern module 108 may identify multiple edit operations with respect to the particular fault in the defective software program 104.

In some embodiments, the edit operation may be based on one or more differences between the defective software program 104 and the improved software program 106. In other embodiments, the edit operation may be based on fault types of the faults in the defective software program 104 that are determined by program analysis (e.g., static analysis). For example, the fix patterns 110 may receive a static fault identifier from and/or generate the static fault identifier using a static analyzer. In some embodiments, the static fault identifier may include descriptions of a repository and a line number in the DSL of the defective software program 104 that correspond to the faults.

In the string example, the static fault identifier for the strong software program in the example DSL may be:
SBSC_USE_STRINGBUFFER_CONCATENATION (performance issue) violation at PurgeLocalRepositoryMojo.java:632 .

Alternatively, the edit operation may be identified based on a comparison of the DSL of the defective software program 104 and the DSL of the improved software program 106. Additionally or alternatively, the edit operation may be identified based on a comparison of a defect AST representative of the defective software program 104 and an improved AST representative of the improved software program 106. In these and other embodiments, the defect AST and the improved AST may provide a more accurate representation of the differences between the defective software program 104 and the improved software program 106 than compared to using the source code and/or fault types to determine the differences.

In some embodiments, the edit operation may indicate a single modification (e.g., a single edit) was made to the defective software program 104 to obtain the improved software program 106. Alternatively, the edit operation may indicate multiple modifications were made to the defective software program 104 to obtain the improved software program 106. For example, the edit operation may indicate a first edit applies to a first fault in the defective software program 104 and a second edit applies to a second fault in the defective software program 104.

In the string example, the edit operation may indicate that four edits occurred to the DSL of the string software routine. The four edits represented in natural language may include: replace declaration type with StringBuffer, initialize with a constructor call, replace all additive assignments with append, and replace all string uses with a call to toString. Additionally, the four edits to the DSL of the string software routine represented in the example DSL (e.g., source code), may include:

$$op_1 = \text{Update}(L, \text{ConstNode}(\text{VarDecl}, \text{``StringBuffer''}, L.\text{var}, \text{ConstNode}(\text{Constructor}, \text{Type}(\text{``StringBuffer''}), L.\text{init})))$$
$$op_2 = \text{Update}(L, \text{ConstNode}(\text{MethodInvocation}, L.\text{lhs}, \text{``append''}, L.\text{rhs}))$$
$$op_3 = \text{Update}(L, \text{ConstNode}(\text{MethodInvocation}, L.\text{lhs}, \text{``append''}, L.\text{rhs}))$$
$$op_4 = \text{Update}(n, \text{ConstNode}(\text{MethodInvocation}, n.\text{name}, \text{``toString''}, \text{null}))$$

In some embodiments, the fix pattern module 108 may obtain the defect AST and the improved AST from the big code 102. In other embodiments, the fix pattern module 108 may generate the defect AST using the defective software program 104 and the improved AST using the improved software program 106. The defect AST and the improved AST may be generated using any appropriate AST generation technique.

The defect AST and the improved AST may represent an abstract syntactic structure of the defective software program 104 and the improved software program 106 respectively. Additionally, the defect AST and the improved AST may include multiple nodes. Each node may correspond to an element of the corresponding software program (e.g., a construct of the corresponding software program).

The defect AST may include multiple operational nodes and one or more defect nodes. The operational nodes may correspond to elements in the DSL of the defective software program 104 that are not associated with any faults. Additionally, the defect nodes may correspond to elements in the DSL of the defective software program 104 that are associated with the faults. In some embodiments, the defect nodes may correspond to a fault location of the faults in the defective software program 104.

The defect nodes may include one or more edit nodes. The edit nodes may correspond to the portions of the DSL of the defective software program 104 that are edited to obtain the improved software program 106.

The defect AST and the improved AST may also include multiple AST edges. The AST edges may represent jumps in the control flow of the corresponding software program.

Additionally, the AST edges may represent hops between the nodes of the corresponding AST.

In some embodiments, the fix pattern module 108 may identify fault attributes of each of the faults in the defective software program 104. The fix pattern module 108 may identify fault attributes that are common to at least a portion of the faults in the defective software program 104. In some embodiments, the fault attributes may include a fault type, fault location, node name, other node attributes such as a pair of a key and a corresponding value (e.g., the key is "type" and the corresponding value is "String"), node type, and node labels. In some embodiments, the fault attributes may correspond to attributes of the DSL of the defective software program 104. In other embodiments, the fault attributes may correspond to attributes of ASTs representative of the defective software program 104.

In some embodiments, the fix pattern module 108 may classify a fault attribute as a common fault attribute if the fault attribute is associated with each of the faults in the defective software program 104. In other embodiments, the fix pattern module 108 may classify a fault attribute as a common fault attribute if the fault attribute is associated with at least a portion of the faults in the defective software program 104. In some embodiments, a fault attribute may be classified as a common fault attribute if the fault attribute is associated with at least a majority of the faults in the defective software program 104.

In some embodiments, the big code 102 may include multiple defective software programs 104. In these and other embodiments, the fix pattern module 108 may identify common fault attributes using the multiple defective software programs 104 rather than a single defective software program 104.

Additionally or alternatively, the fix pattern module 108 may obtain the test defective software programs 107 from the big code 102. In some embodiments, the test defective software programs 107 may include multiple software programs that include faults. The faults in the test defective software programs 107 may be the same or similar to the faults in the defective software program 104. For example, the faults in the test defective software programs 107 may be of the same or similar fault type. As another example, the faults in the test defective software programs 107 may include the same or similar fault locations.

In some embodiments, the fix pattern module 108 may identify fault attributes of each of the faults in the test defective software programs 107. In these and other embodiments, the fix pattern module 108 may identify the fault attributes that are common to at least a portion of the faults in the test defective software programs 107. In some embodiments, the fault attributes may include a fault type, fault location, node name, other node attributes such as a pair of a key and a corresponding value (e.g., the key is "type" and the corresponding value is "String"), node type, and node labels. In some embodiments, the fault attributes may correspond to attributes of the DSL of the test defective software programs 107. In other embodiments, the fault attributes may correspond to attributes of ASTs representative of the test defective software programs 107.

In some embodiments, the fix pattern module 108 may classify a fault attribute as a common fault attribute if the fault attribute is associated with each of the faults in the test defective software programs 107. In other embodiments, the fix pattern module 108 may classify a fault attribute as a common fault attribute if the fault attribute is associated with at least a portion of the faults in the test defective software programs 107. In some embodiments, a fault attribute may be classified as a common fault attribute if the fault attribute is associated with at least a majority of the faults in the test defective software programs 107.

The fix pattern module 108 may use the common fault attributes (e.g., obtained from the defective software program 104, other defective software programs 104, and/or the test defective software programs 107) to classify one or more defect nodes associated with the defective software program 104 as a primary node. In some embodiments, the fix pattern module 108 may determine whether any defect nodes are associated with any of the common fault attributes. In some embodiments, the fix pattern module 108 may classify a defect node as a primary node if the defect node is associated with all of the common fault attributes. Alternatively, the fix pattern module 108 may classify a defect node as a primary node if the defect node is associated with at least one of the common fault attributes.

In some embodiments, the fix pattern module 108 may classify one defect node associated with a particular fault of the defective software program 104 as a primary node. In other embodiments, the fix pattern module 108 may classify more than one defect node associated with the particular fault of defective software program 104 as a primary node. In some embodiments, the fix pattern module 108 may classify a single defect node in the defect AST as the primary node. In other embodiments, the fix pattern module 108 may classify more than one defect node in the defect AST as the primary node.

In some embodiments, the primary node may operate as a starting point in implementing the edit operation. In other embodiments, the primary node may operate as a starting point in implementing a portion of the edit operation. Additionally, the primary node may operate as a starting point in implementing multiple edit operations. In some embodiments, the primary node may be center to the modifications made to the defective software program 104 to obtain the improved software program 106. In some embodiments, the primary node may also be classified as an edit node.

The fix pattern module 108 may use the primary node to generate a search condition to determine a defective line of code in a different software program (e.g., the code under test 111) that may operate as the starting point in implementing the edit operation. A defect node corresponding to the defective line of DSL in the different software program that operates as the starting point in implementing the edit operation may be classified as the primary node. Additionally or alternatively, the fix pattern module 108 may use the primary node to generate a search condition to directly determine which defect nodes correspond to the defective line of DSL in the different software program that may operate as the starting point in implementing the edit operation.

In the string example, the search condition in the example DSL generated by the fix pattern module 108 may be:
pNode=MatchContext(id(nodeType:AssignStmt), SAnalyzerReport( ))

The fix pattern module 108 may generate a visitor AST based on the defect AST. The visitor AST may correspond to the defective software program 104. Additionally, the visitor AST may represent a programmatic structure of the defective software program 104. The visitor AST may include multiple visitor edges. The visitor edges may represent programmatic relationships between nodes in the visitor AST. Programmatic relationships may include parent, child, decl, lhs, caller, or any other appropriate programmatic relationships.

In some embodiments, the fix pattern module 108 may generate a duplicate defect AST that includes each node and each AST edge of the defect AST. In some embodiments, the fix pattern module 108 may remove all of the AST edges from the duplicate defect AST. The fix pattern module 108 may add visitor edges between the various nodes in the duplicate defect AST. When the visitor edges are added, the duplicate defect AST may be classified as the visitor AST.

The fix pattern module 108 may identify each visitor path in the visitor AST between the primary node and each edit node. A visitor path may be a path of visitor edges that may be followed from the primary node to an edit node. Multiple visitor paths may include the same or similar sequence of visitor edges from a primary node to different edit nodes. Additionally, multiple visitor paths may include the same or similar sequence of visitor edges from multiple primary nodes to one or more edit nodes. For example, a visitor path from a first primary node and a first edit node may include the same or similar sequence of visitor edges as a visitor path from a second primary node to a second edit node.

In the string example, the visitor paths from the primary node to a first edit node may include:
    id.parent( )parent( )child(3)
        id.lhs( )decl( )update( )
            id.decl( )update( )
Additionally, the visitor paths from the primary node to a second edit node may include:
    id.parent( )parent( )child(1)
        id.lhs( )decl( )update( )
            id.decl( )update( )

The fix pattern module 108 may group edit nodes based on the edit nodes including common visitor paths from a primary node. In some embodiments, the edit nodes may be grouped (e.g., clustered) based on the edit nodes including common visitor paths from a single primary node. In other embodiments, the edit nodes may be grouped (e.g., clustered) based on the edit nodes including common visitor paths from multiple primary nodes. The fix pattern module 108 may determine whether visitor paths associated with different edit nodes are common visitor paths.

In some embodiments, visitor paths may be common visitor paths if the visitor paths include the same or similar sequence of visitor edge types. Additionally, visitor paths may be common visitor paths if the visitor paths include the same or similar visitor path descriptions. Alternatively, visitor paths may be common visitor paths if the visitor paths include the same or similar sequence of visitor edge descriptors.

In the string example, the common visitor paths may include the visitor edge descriptors of:
    id.lhs( )decl( )update( )
        id.decl( )update( )

In some embodiments, the fix pattern module 108 may classify one of the common visitor paths as a preferred visitor path. In some embodiments, the preferred visitor path may be determined based on the common visitor path that include a fewest number of visitor edges (e.g., a fewest number of hops) from the primary node to the edit nodes. In other embodiments, the preferred visitor path may be determined based on the common visitor path that includes a lower weighted path length relative to other common visitor paths. In these and other embodiments, each edge in the common visitor paths may include a weighted value, such as three, two, one, or any other appropriate value. For example, a first edge associated with an lhs( )programmatic relationship between a first node and a second edge may include a weighted value of three and a second edge associated with an update( )programmatic relationship between the second node and a third node may include a weighted value of two. The weighted path length of a common visitor path may be the sum of the weighted values associated with edge in the common visitor paths. For example, a common visitor path between the first node and the third node that traverses the second node may include a weighted path length of five (e.g., three (the weighted value of the first edge) +two (the weighted value of the second edge)=five).

A benefit of grouping two or more edit nodes may be a reduction in usage of memory for storing the fix patterns 110. Another benefit may be that the fix patterns 110 may be generated as a more generalized repair pattern than fix patterns 110 without grouping (e.g., clustering).

In the string example, the preferred visitor path may be:
    id.decl( )update( )

The fix patterns 110 may specify locations of the modifications to the DSL of the defective software program 104 relative to the primary nodes. In some embodiments, the fix patterns 110 may be generated in a format compatible with the DSL (e.g., the source code and/or computer language) of the defective software program 104. For example, the fix patterns 110 in core DSL may include:
    fixpattern ::=FixPattern(name, $rule_1$, $rule_2$, . . . , $ruler_n$)
    rule ::=ApplyFixes(primaryNode, $fix_1$, $fix_2$, . . . , $fix_n$)
        primaryNode ::=MatchCtx(ctx, SAnalyzerReport( ))
            ctx ::=ctxpath(attrs)|$ctx_1 \wedge ctx_2$
    ctxpath ::=$cbcpath_1.cbcpath_2$|id|child(i)|parent( )|child (type, i)| . . .
        attrs ::=true|{key:value} ∪attrs
    fix ::=Map($\lambda$ L→Edit(L, operation), editLocations)
    editLocations ::=Visit(primaryNode, $visitpattern_1$, . . . , $visitpattern_n$)
    visitpattern ::=visitpath|visitpath ⊕ ctx
    visitpath ::=$visitpath_1.visitpath_2$|id|child(i)|parent( )|dec( )|use( )| . . .
        operation ::=Insert(x, ast, k)|Delete(x, ref)|Update(x, ast)
        ast ::=const|ref
        const ::=ConstNode(kind, value, $ast_1$, . . . , $ast_n$)
        ref ::=Visit(n, visitpattern)

In some embodiments, the fix pattern module 108 may generate the fix patterns 110 based on one or more visitor paths and the edit operation. For example, if the defect AST includes four defect nodes that are not grouped and one of which is the primary node, the fix patterns 110 may be based on four visitor paths (e.g., a preferred visitor path from the primary node to each of the other three defect nodes and a visitor path to the primary node) and the edit operation. As another example, if the defect AST includes four defect nodes two of which are grouped and one of the grouped nodes is the primary node, the fix patterns 110 may be based on three visitor paths (e.g., a preferred visitor path from the primary node to the two non-grouped defect nodes and a visitor path to the primary node) and the edit operation. In some embodiments, the fix patterns 110 may be based on multiple edit operations.

In the string example, a portion of the fix patterns 110 in the core DSL may be:
    FixPattern("SBSC_USE_STRINGBUFFER_CONCATENATION", rule) where
        rule=ApplyFixes(pNode, fix1, fix2, fix3)
        pNode=MatchContext(id(nodeType:AssignStmt), SAnalyzerReport( ))
        eLoc1=Visit(n, id.decl( ).update( ))
            eLoc2=Visit(n, id.decl( ))
        eLoc3=Visit(n, id.decl( ).use( ))

fix1=Map(λL→Edit(L, op1), eLoc1)
op1=Update(L, ConstNode(MethodInvocation, L.lhs, "append", L.rhs))
fix2=Map(λL→Edit(L, op2), eLoc2)
op2=Update(L, ConstNode(VarDecl, "StringBuffer", L.var, ConstNode(Constructor, Type("StringBuffer"), L.init)))
fix3=Map(λL→Edit(L, op3), eLoc3)
op3=Update(n, ConstNode(MethodInvocation, n.name, "toString", null))

The repair module 109 may receive the fix patterns 110. Additionally, the repair module 109 may receive the code under test 111. In some embodiments, the repair module 109 may be configured to perform static analysis of the code under test 111. In some embodiments, the repair module 109 may determine whether the faults in the code under test 111 are the same or similar to the faults in the defective software program 104. The faults in the code under test 111 may be the same or similar to the faults in the defective software program 104 if the faults include the same or similar fault types, fault locations, node name, other node attributes such as a pair of a key and a corresponding value (e.g., the key is "type" and the corresponding value is "String"), node type, and node labels In response to the faults in the code under test 111 being the same or similar to the faults in the defective software program 104, the repair module 109 may modify the code under test 111 using the fix patterns 110 to generate the modified code under test 113. For example, the repair module 109 may make the same or similar modifications to the code under test 111 that were made to the defective software to obtain the improved software program 106. Thus, the modified code under test 113 may be an improved version of the code under test 111.

Modifications, additions, or omissions may be made to FIG. 1 without departing from the scope of the present disclosure. For example, the environment 100 may include more or fewer elements than those illustrated and described in the present disclosure. In addition, in some embodiments, one or more routines, one or more instructions, or at least a portion of code of the fix pattern module 108, the fix patterns 110, and the repair module 109 may be combined or separated. In some embodiments operations may be performed in a different order from what is described above. Additionally, while the big code 102 is illustrated as including a single defective software program 104 and a single improved software program 106, the big code 102 may include any number of the defective software programs 104 and the improved software programs 106, such as two defective software programs 104 and improved software programs 106, five defective software programs 104 and improved software programs 106, or one thousand defective software programs 104 and improved software programs 106.

Figure 2:
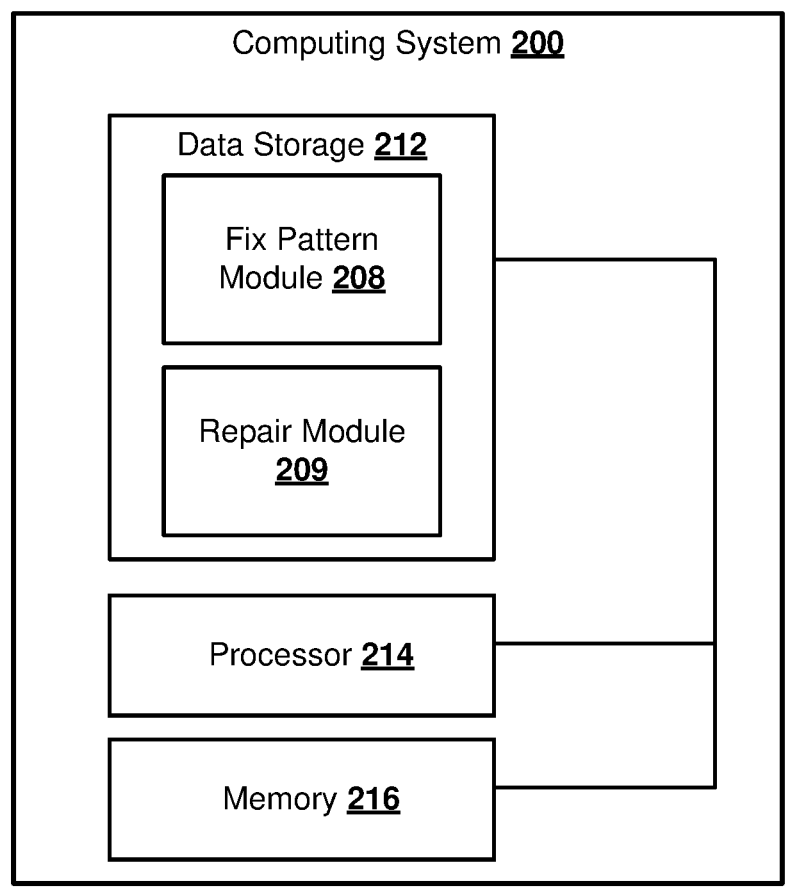
FIG. 2 depicts an example computing system that may be configured to generate a fix pattern that may be used to perform repair operations of a software program.

FIG. 2 depicts an example computing system 200 that may be configured to generate a fix pattern that may be used to perform repair operations of a software program. The computing system 200 may be implemented in the environment 100 of FIG. 1, for instance. The computing system 200 may include one or more processors 214, a memory 216, and a data storage 212 that includes a fix pattern module 208 and a repair module 209. The fix pattern module 208 may be the same or similar as the fix pattern module 108 of FIG. 1. The repair module 209 may be the same or similar as the repair module 109 of FIG. 1.

The processor 214 may include any suitable special-purpose or general-purpose computer, computing entity, or processing device including various computer hardware or software modules and may be configured to execute instructions stored on any applicable computer-readable storage media. For example, the processor 214 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 2, the processor 214 may more generally include any number of processors configured to perform individually or collectively any number of operations described in the present disclosure. Additionally, one or more of the processors 214 may be present on one or more different electronic devices or computing systems. In some embodiments, the processor 214 may interpret and/or execute program instructions and/or process data stored in the memory 216, the data storage 212, or the memory 216 and the data storage 212. In some embodiments, the processor 214 may fetch program instructions from the data storage 212 and load the program instructions in the memory 216. After the program instructions are loaded into the memory 216, the processor 214 may execute the program instructions.

The memory 216 and the data storage 212 may include computer-readable storage media for carrying or having computer-executable instructions or data structures stored thereon. Such computer-readable storage media may include any available media that may be accessed by a general-purpose or special-purpose computer, such as the processor 214. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other non-transitory storage medium which may be used to carry or store program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 214 to perform a certain operation or group of operations.

The fix pattern module 208 and/or the repair module 209 may include program instructions stored in the data storage 212. The processor 214 may be configured to load the fix pattern module 208 and/or the repair module 209 into the memory 216 and execute load the fix pattern module 208 and/or the repair module 209. Alternatively, the processor 214 may execute the load the fix pattern module 208 and/or the repair module 209 line-by-line from the data storage 212 without loading them into the memory 216. When executing the fix pattern module 208 and/or the repair module 209, the processor 214 may be configured to generate a fix pattern as described elsewhere in this disclosure.

Modifications, additions, or omissions may be made to the computing system 200 without departing from the scope of the present disclosure. For example, in some embodiments, the computing system 200 may include any number of other components that may not be explicitly illustrated or described. The embodiments described herein may include the use of a special-purpose or general-purpose computer including various computer hardware or software modules, as discussed in greater detail below.

Figure 3:
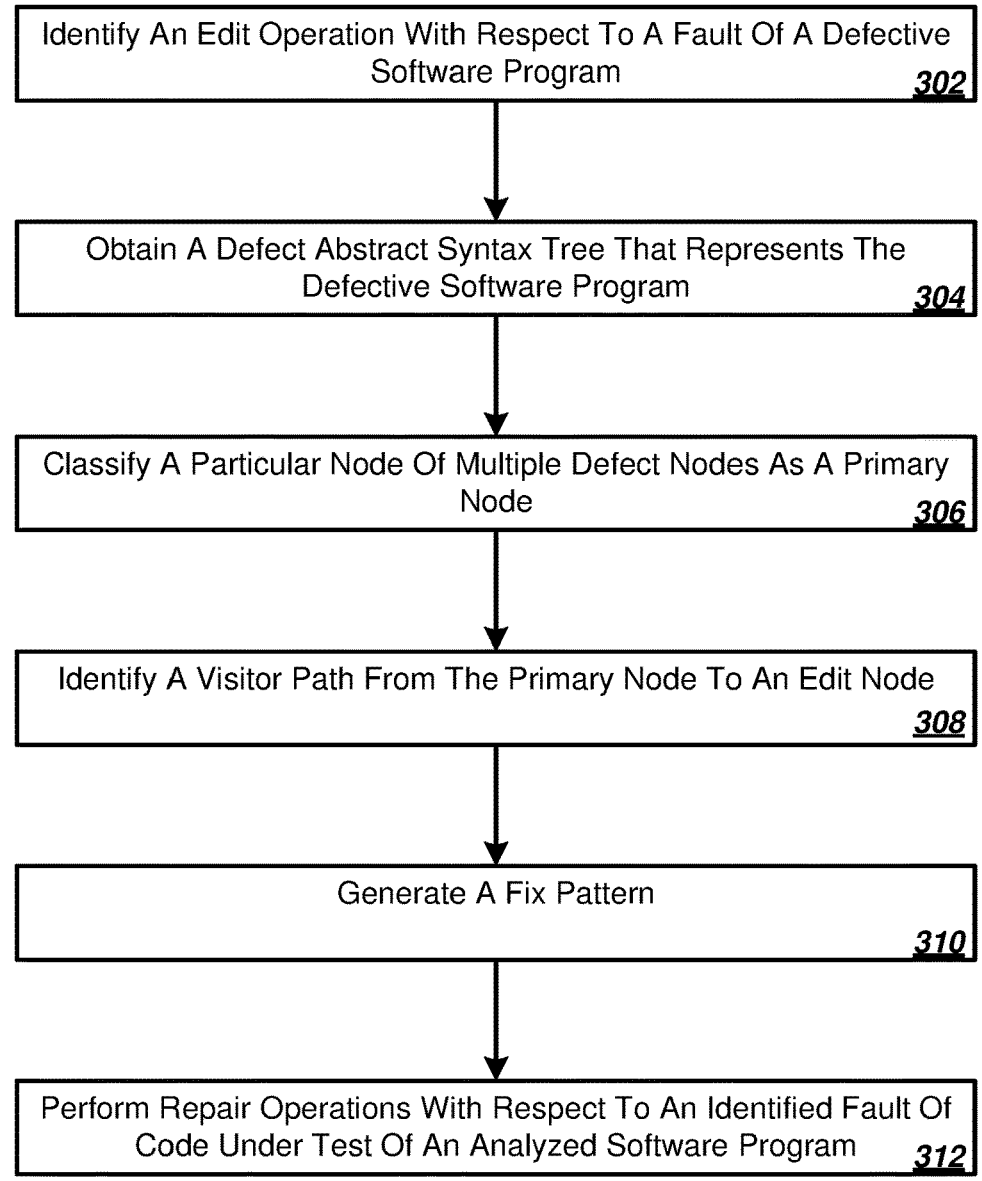
FIG. 3 depicts a flowchart of an example method of repairing a software program.

FIG. 3 depicts a flowchart of an example method 300 of repairing a software program. The method 300 may be performed by any suitable system, apparatus, or device with respect to a defective software program and an improved software program (e.g., the defective software program 104 and improved software program 106 of FIG. 1). For example, the fix pattern module 108 and/or the repair module of FIG. 1 or the computing system 200 of FIG. 2 (e.g., as directed by a fix pattern module and/or a repair module) may perform or direct performance of one or more of the operations associated with the method 300 with respect to the defective software program and the improved software program. Although illustrated with discrete blocks, the steps and operations associated with one or more of the blocks of the method 300 may be divided into additional blocks, combined into fewer blocks, or eliminated, depending on the particular implementation.

The method 300 may include a block 302, at which an edit operation with respect to a fault of a defective software program may be identified. In some embodiments, the edit operation may be identified based on one or more differences between the defective software program and an improved software program that includes the edit operation as a repair of the fault. The edit operation may include one or more edits to the defective software program at one or more fault locations to repair the respective fault such that the improved software program may be obtained. In some embodiments, the defective software program and the improved software program may be obtained from big code, such as the big code 102 of FIG. 1.

At block 304, a defect AST that represents the defective software program may be obtained. In some embodiments, the defect AST may include multiple defect nodes that correspond to a fault location of the defective software program that includes the fault. In these and other embodiments, the defect nodes may include an edit node that is changed by the edit operation. In some embodiments, the defect AST may be obtained from a separate source, such as from big code (e.g., the big code of FIG. 1). In other embodiments, the defect AST may be generated locally.

At block 306, a particular node of multiple defect nodes may be classified as a primary node. The primary node may operate as a starting point in implementing the edit operation. In some embodiments the particular node may be classified as the primary node based on the particular node including one or more common fault attributes. In some embodiments, the particular node may be classified as the primary node based on one or more operations of the method 500 of FIG. 5 described in detail below.

At block 308, a visitor path from the primary node to an edit node may be identified. In some embodiments, the visitor path may be included in a visitor AST that corresponds to the defect AST. In these and other embodiments, the visitor path may include a sequence of one or more visitor edges that indicate a programmatic relationship between the primary node and the edit node. The visitor AST may be generated as discussed above in relation to FIG. 1.

At block 310, a fix pattern may be generated. In some embodiments, the fix pattern may be generated in a format compatible with a source code of the defective software program. For example, the fix pattern may be generated in DSL that is compatible with the defective software program.

At block 312, repair operations may be performed with respect to an identified fault of code under test of an analyzed software program. In some embodiments, the repair operations may be performed using the fix pattern. In these and other embodiments, the repair operations may be performed based on the identified fault of the code under test being of a same type as the fault of the defective software program.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In addition, in some embodiments, the method 300 may be performed iteratively in which one or more operations may be performed with respect to a single fault location at a time.

Additionally or alternatively, one or more operations associated with one or more blocks may be performed with respect to multiple fault locations at a time.

Figure 4:
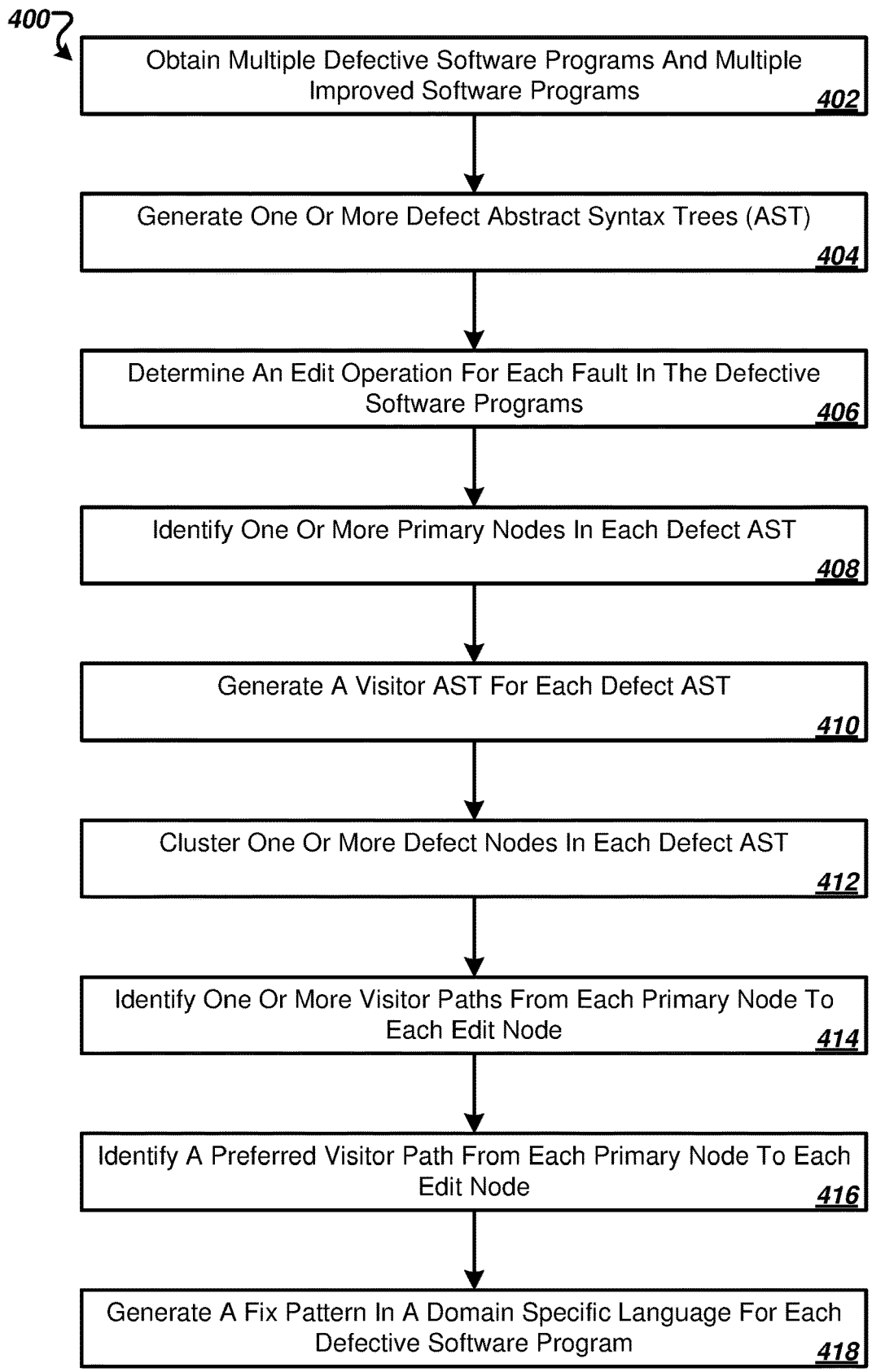
FIG. 4 depicts a flowchart of an example method of generating a fix pattern that may be used to perform repair operations of a software program.

FIG. 4 depicts a flowchart of an example method 400 of generating a fix pattern that may be used to perform repair operations of a software program. The method 400 may be performed by any suitable system, apparatus, or device with respect to a defective software program and an improved software program (e.g., the defective software program 104 and improved software program 106 of FIG. 1). For example, the fix pattern module 108 of FIG. 1, the repair module 109, or the computing system 200 of FIG. 2 (e.g., as directed by a fix pattern module and/or a repair module) may perform or direct performance of one or more of the operations associated with the method 400 with respect to the defective software program and the improved software program. Although illustrated with discrete blocks, the steps and operations associated with one or more of the blocks of the method 400 may be divided into additional blocks, combined into fewer blocks, or eliminated, depending on the particular implementation. Additionally, one or more operations of the method 300 may be performed as part of the method 400 in some embodiments.

The method 400 may begin at block 402, at which multiple defective software programs and multiple improved software programs may be obtained. The defective software programs and multiple improved software programs may be obtained from big code, such as the big code of FIG. 1.

At block 404, one or more defect ASTs may be generated. In some embodiments, a defect AST may be generated for each of the defective software programs. In some embodiments, the defect ASTs may include multiple defect nodes that correspond to a fault location of the defective software programs that includes one or more faults. In these and other embodiments, the defect nodes may include edit nodes that are changed by edit operations.

At block 406, the edit operations may be determined for each fault in the defective software programs. In some embodiments, the edit operations may be identified based on one or more differences between the defective software programs and the improved software programs. The edit operations may include one or more edits to the defective software programs at the fault locations to repair the respective faults such that the improved software programs may be obtained.

In some embodiments, a second edit operation with respect to a second fault of a defective software program may be identified. In some embodiments, the second edit operation may also be identified based on one or more differences between the defective software program and the improved software program that includes the second edit operation as a repair of the second fault. The second edit operation may include one or more edits to the defective software program at one or more fault locations to repair the respective second fault such that the improved software program may be obtained.

At block 408, one or more primary nodes may be identified in each defect AST. The primary nodes may operate as starting points in implementing the edit operations. In some embodiments the nodes may be classified as the primary nodes based on the nodes including one or more common fault attributes. In some embodiments, one or more of the nodes may be classified as primary nodes based on one or more operations of the method 500 of FIG. 5 described in detail below.

For example, a particular node of multiple defect nodes may be classified as a first primary node. The first primary node may operate as a starting point in implementing a first edit operation. In some embodiments the particular node may be classified as the first primary node based on the particular node including one or more common fault attributes. In these and other embodiments, the particular node may be classified as the first primary node based on one or more operations of the method 500 of FIG. 5.

As another example, another particular node of multiple defect nodes may be classified as a second primary node. The second primary node may operate as a starting point in implementing the second edit operation. In some embodiments the another node may be classified as the second primary node based on the another node including one or more common fault attributes. In some embodiments, the another particular node may be classified as the second primary node based on one or more operations of the method 500 of FIG. 5.

At block 410, a visitor AST may be generated for each defect AST. In some embodiments, the visitor ASTs may be based on the defect ASTs. In these and other embodiments, the visitor ASTs may correspond to the defective software programs. Additionally, the visitor ASTs may represent a programmatic structure of the defective software programs. The visitor ASTs may include multiple visitor edges. The visitor edges may represent programmatic relationships between the nodes in the visitor ASTs. The visitor ASTs may be generated as discussed above in relation to FIG. 1.

At block 412, one or more defect nodes in each defect AST may be clustered. In some embodiments, the defect nodes may be clustered (e.g., grouped) based on the defect nodes being identified as edit nodes and including common visitor paths from a primary node in the visitors ASTs. In these and other embodiments, the defect nodes may be clustered based on the defect nodes including common visitor paths from a single primary node in the visitor ASTs. In other embodiments, the defect nodes may be clustered based on the defect nodes including common visitor paths from multiple primary nodes in the visitor ASTs.

At block 414, one or more visitor paths from each primary node to each edit node may be identified. In some embodiments, the visitor paths may be identified for each visitor AST. In these and other embodiments, the visitor paths may include a sequence of one or more visitor edges that indicate a programmatic relationship between the primary nodes and the edit nodes.

For example, a first visitor path from the first primary node to a first edit node may be identified. In some embodiments, the first visitor path may be included in the visitor AST. In some embodiments, the first visitor path may include a sequence of one or more visitor edges that indicate a programmatic relationship between the first primary node and the first edit node.

As another example, a second visitor path from the second primary node to a second edit node may be identified. In some embodiments, the second visitor path may also be included in the visitor AST. In these and other embodiments, the second visitor path may include a sequence of one or more visitor edges that indicate a programmatic relationship between the second primary node and the second edit node.

At block 416, a preferred visitor path from each primary node to each edit node may be identified. In some embodiments, the preferred visitor paths may be identified for each primary node and each edit node in the visitor ASTs. In these and other embodiments, the preferred visitor paths may be determined based on common visitor paths. In some embodiments, the visitor paths may be common visitor paths if the visitor paths include the same or similar sequence of visitor edge types. In these and other embodiments, the visitor paths may be preferred visitor paths if the visitor paths includes a fewest number of visitor edges (e.g., a fewest number of hops) from the primary nodes to the edit nodes.

At block 418, a fix pattern may be generated in a DSL for each defective software program. In some embodiments, the fix patterns may be generated in a format compatible with a source code of the defective software programs.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In addition, in some embodiments, the method 400 may be performed iteratively in which a single defective software program and a single improved software program may be analyzed at a single time.

Figure 5:
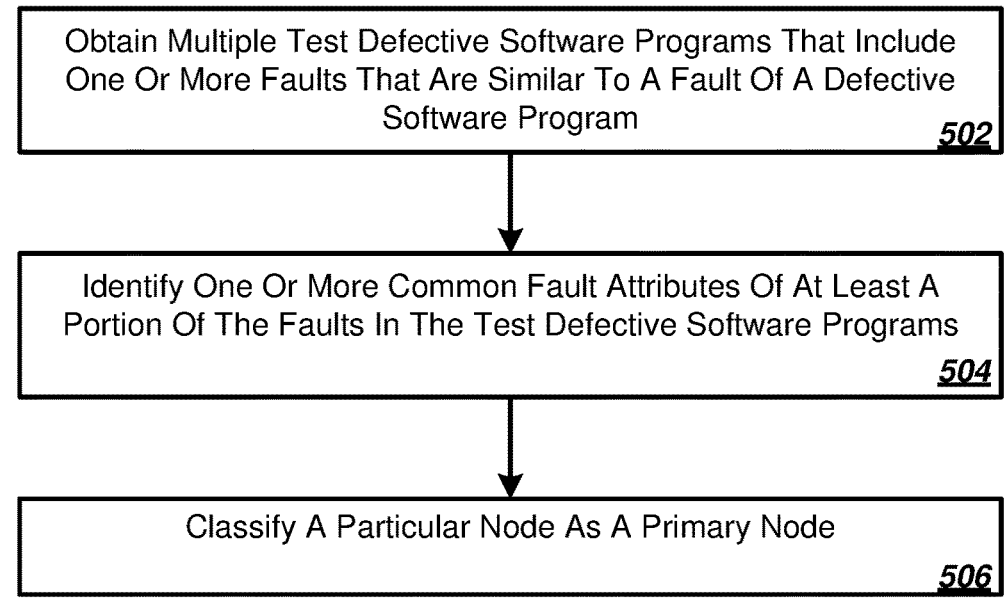
FIG. 5 depicts a flowchart of an example method of classifying a particular node as a primary node.

FIG. 5 depicts a flowchart of an example method 500 of classifying a particular node as a primary node. The method 500 may be performed by any suitable system, apparatus, or device with respect to a test defective software program and a defective software program (e.g., the test defective software programs 107 and the defective software program 104 of FIG. 1). For example, the fix pattern module 108 of FIG. 1 or the computing system 200 of FIG. 2 (e.g., as directed by a fix pattern module) may perform or direct performance of one or more of the operations associated with the method 500 with respect classifying a particular node as a primary node. Although illustrated with discrete blocks, the steps and operations associated with one or more of the blocks of the method 500 may be divided into additional blocks, combined into fewer blocks, or eliminated, depending on the particular implementation. As indicated above, in some instances, one or more of the operations of the method 500 may be performed with respect to block 306 of the method 300 and block 408 of the method 400.

The method 500 may begin at block 502, at which multiple test defective software programs that include one or more faults that are similar to a fault of a defective software program may be obtained. The test defective software programs may be obtained from a big code, such as the big code of FIG. 1.

At block 504, one or more common fault attributes of at least a portion of the faults in the test defective software programs may be identified. In some embodiments, a fault attribute may be identified as a common fault attribute if the fault attribute is associated with each of the faults in the test defective software programs. In other embodiments, a fault attribute may be identified as a common fault attribute if the fault attribute is associated with at least a portion of the faults in the test defective software programs. Additionally, a fault attribute may be classified as a common fault attribute if the fault attribute is associated with at least a majority of the faults in the test defective software programs. In some embodiments, a fault attribute may be classified as a common fault attribute if the fault attribute is associated with at least a threshold percentage of the faults in the test defective software programs as discussed above in relation to FIG. 1.

At block 506, a particular node may be classified as a primary node. In some embodiments the primary node may operate as a starting point in implementing an edit operation as discussed above in relation to FIG. 1. In some embodiments the particular node may be classified as the primary node based on the particular node including one or more of the common fault attributes.

In some embodiments, the particular node may be classified as the primary node based on the particular node being associated with any of the common fault attributes. In other embodiments, the particular node may be classified as the primary node based on the particular node being associated with all of the common fault attributes. Additionally, the particular node may be classified as the primary node based on the particular node being associated with at least a primary threshold percentage of the common fault attributes as discussed above in relation to FIG. 1. Alternatively, the particular node may be classified as the primary node based on the particular node being associated with at least one of the common fault attributes Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 6:
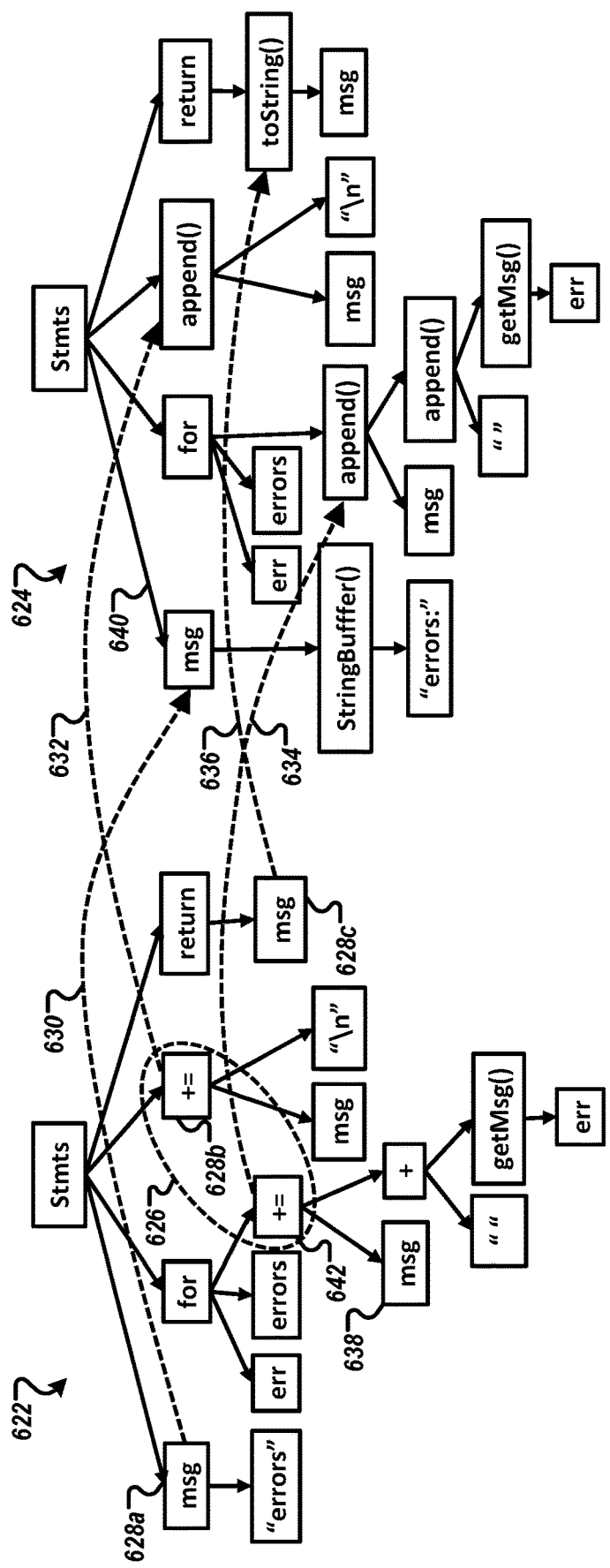
FIG. 6 depicts an example defect AST and an example improved AST that may be implemented in the environment of FIG. 1, all according to at least one embodiment described in the present disclosure.

FIG. 6 depicts an example defect AST 622 and an example improved AST 624 that may be implemented in the environment 100 of FIG. 1. The defect AST 622 and the improved AST 624 may correspond to the string example discussed in the present disclosure. The defect AST 622 and the improved AST 624 may each include multiple nodes. In FIG. 6, a single node 638 is denoted as 638 to illustrate an example node. Control flow of the nodes in the defect AST 622 may be represented as AST edges. In FIG. 6, a single AST edge is denoted as 640 to illustrate an example AST edge. The AST edges may represent jumps in the control flow of the string software routine.

The nodes in the defect AST 622 may include one or more edit nodes that are to be modified in relation to an edit operation as discussed above in relation to FIG. 1. In FIG. 6, three edit nodes are denoted as 628a, 628b, and 628c to illustrate multiple example edit nodes. Additionally, the nodes in the defect AST 622 may include a primary node 642. The primary node 642 may operate as a starting point for implementing the edit operation to obtain the improved AST 624 and the improved software program as discussed above in relation to FIG. 1. In some embodiments, the primary node 642 may also be classified as an edit node.

In some embodiments, the primary node 642 and an edit node 628b may be grouped (e.g., clustered) based on the primary node and the edit node 628b including a common visitor path as discussed above in relation to FIG. 1. In FIG. 6, an oval denoted as 626 may represent the grouping of the primary node and the edit node 628b.

As discussed above, the edit operation may include four edits to the string software routine. A first edit may correspond to the following example DSL:

op1=Update(L, ConstNode(VarDecl, "StringBuffer", L.var, ConstNode(Constructor, Type("StringBuffer"), L.init)))

A second edit may correspond to the following example DSL:

op2=Update(L, ConstNode(MethodInvocation, L.lhs, "append", L.rhs))

A third edit may correspond to the following example DSL:

op3=Update(L, ConstNode(MethodInvocation, L.lhs, "append", L.rhs))

A fourth edit may correspond to the following example DSL:

op4=Update(n, ConstNode(MethodInvocation, n.name, "toString", null))

In FIG. 6, dashed arrows may represent the various edits. In FIG. 6, the first edit may be represented by dashed arrow 632, the second edit may be represented by dashed arrow 634, the third edit may be represented by dashed arrow 636, and the fourth edit may be represented by dashed arrow 634.

As indicated above, the embodiments described in the present disclosure may include the use of a special purpose or general purpose computer (e.g., the processor 214 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc."

is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    identifying a first edit operation with respect to a first fault of a defective software program based on one or more differences between the defective software program and an improved software program that includes the first edit operation as a repair of the first fault;
    identifying a second edit operation with respect to a second fault of the defective software program based on the one or more differences between the defective software program and the improved software program, which includes the second edit operation as a repair of the second fault;
    obtaining a defect abstract syntax tree (AST) that represents the defective software program, the defect AST including a plurality of defect nodes that correspond to one or more fault locations of the defective software program, the plurality of defect nodes including a first edit node that is changed by the first edit operation and including a second edit node that is changed by the second edit operation;
    classifying a first particular node of the plurality of defect nodes as a first primary node that operates as a first starting point in implementing the first edit operation;
    classifying a second particular node of the plurality of defect nodes as a second primary node that operates as a second starting point in implementing the second edit operation;
    obtaining a visitor AST, wherein the visitor AST includes:
        each node in the defect AST;
        one or more first visitor edges that indicate a first programmatic relationship between the first edit node and the first primary node; and
        one or more second visitor edges that indicate a second programmatic relationship between the second edit node and the second primary node;
    identifying a first visitor path from the first primary node to the first edit node in the visitor AST that includes a first sequence of the one or more first visitor edges;
    identifying a second visitor path from the second primary node to the second edit node in the visitor AST that includes a second sequence of the one or more second visitor edges;
    generating one or more fix patterns based on the first visitor path, the second visitor path, the first edit operation, and the second edit operation, one or more fix patterns are generated in a format compatible with a source code of the defective software program; and
    performing repair operations with respect to an identified fault of code under test of an analyzed software program using the one or more fix patterns.

2. The method of claim 1, wherein the plurality of defect nodes includes a third edit node that is changed by the first edit operation, and the method further comprises, identifying a third visitor path from the first primary node to the third edit node, wherein the one or more fix patterns are further based on the third visitor path.

3. The method of claim 2, further comprising identifying the first visitor path and the third visitor path as being common visitor paths with respect to each other based on the first visitor path and the third visitor path having a same sequence of visitor edges that are of the same type, and the generating of the one or more fix patterns is based on the first visitor path and the third visitor path being identified as being common visitor paths.

4. The method of claim 1, further comprising selecting the first visitor path for use in generating the one or more fix patterns on the first visitor path having a fewest number of visitor edges as compared to other visitor paths associated with the first fault or other faults of the defective software program.

5. The method of claim 1, wherein the defective software program includes a plurality of faults and the classifying the first particular node of the plurality of defect nodes as the first primary node comprises:
    identifying a plurality of common fault attributes of at least a portion of the plurality of faults in the defective software program, wherein the first particular node of the plurality of defect nodes is classified as the first primary node based on the first particular node including one or more of the plurality of common fault attributes of the portion of the plurality of faults in the defective software program.

6. The method of claim 1, further comprising identifying the first visitor path and the second visitor path as being common visitor paths with respect to each other based on the first visitor path and the second visitor path including similar visitor path descriptions, wherein the generating the one or more fix patterns is based on the first visitor path and the second visitor path being identified as being common visitor paths.

7. One or more non-transitory computer-readable storage media configured to store instructions that, in response to being executed, cause a system to perform operations, the operations comprising:
   identifying a first edit operation with respect to a first fault of a defective software program based on one or more differences between the defective software program and an improved software program that includes the first edit operation as a repair of the first fault;
   identifying a second edit operation with respect to a second fault of the defective software program based on the one or more differences between the defective software program and the improved software program, which includes the second edit operation as a repair of the second fault;
   obtaining a defect abstract syntax tree (AST) that represents the defective software program, the defect AST including a plurality of defect nodes that correspond to one or more fault locations of the defective software program, the plurality of defect nodes including a first edit node that is changed by the first edit operation and including a second edit node that is changed by the second edit operation;
   classifying a first particular node of the plurality of defect nodes as a first primary node that operates as a first starting point in implementing the first edit operation;
   classifying a second particular node of the plurality of defect nodes as a second primary node that operates as a second starting point in implementing the second edit operation;
   obtaining a visitor AST, wherein the visitor AST includes:
      each node in the defect AST;
      one or more first visitor edges that indicate a first programmatic relationship between the first edit node and the first primary node; and
      one or more second visitor edges that indicate a second programmatic relationship between the second edit node and the second primary node;
   identifying a first visitor path from the first primary node to the first edit node in the visitor AST that includes a first sequence of the one or more first visitor edges;
   identifying a second visitor path from the second primary node to the second edit node in the visitor AST that includes a second sequence of the one or more second visitor edges;
   generating one or more fix patterns based on the first visitor path, the second visitor path, the first edit operation, and the second edit operation, one or more fix patterns are generated in a format compatible with a source code of the defective software program; and
   performing repair operations with respect to an identified fault of code under test of an analyzed software program using the one or more fix patterns.

8. The one or more non-transitory computer-readable storage media of claim 7, wherein the plurality of defect nodes includes a third edit node that is changed by the first edit operation, and the operations further comprise, identifying a third visitor path from the first primary node to the third edit node, wherein the one or more fix patterns are further based on the third visitor path.

9. The one or more non-transitory computer-readable storage media of claim 8, wherein the operations further comprise identifying the first visitor path and the third visitor path as being common visitor paths with respect to each other based on the first visitor path and the third visitor path having a same sequence of visitor edges that are of the same type, and the generating of the one or more fix patterns is based on the first visitor path and the third visitor path being identified as being common visitor paths.

10. The one or more non-transitory computer-readable storage media of claim 7, wherein classifying the first particular node of the plurality of defect nodes as the first primary node comprises:
   obtaining a plurality of test defective software programs that includes a plurality of faults that are similar to the first fault of the defective software program; and
   identifying a plurality of common fault attributes of at least a portion of the plurality of faults in the plurality of test defective software programs, wherein the first particular node of the plurality of defect nodes is classified as the first primary node based on the first particular node including one or more of the plurality of common fault attributes of the portion of the plurality of faults in the plurality of test defective software programs.

11. The one or more non-transitory computer-readable storage media of claim 7, wherein the operations further comprise identifying the first visitor path and the second visitor path as being common visitor paths with respect to each other based on the first visitor path and the second visitor path including similar visitor path descriptions, wherein the generating the one or more fix patterns is based on the first visitor path and the second visitor path being identified as being common visitor paths.

12. A system comprising:
   one or more computer-readable storage media configured to store instructions; and
   one or more processors communicatively coupled to the one or more computer-readable storage media and configured to, in response to execution of the instructions, cause the system to perform operations, the operations comprising:
      identifying a first edit operation with respect to a first fault of a defective software program based on one or more differences between the defective software program and an improved software program that includes the first edit operation as a repair of the first fault;
      identifying a second edit operation with respect to a second fault of the defective software program based on the one or more differences between the defective software program and the improved software program, which includes the second edit operation as a repair of the second fault;
      obtaining a defect abstract syntax tree (AST) that represents the defective software program, the defect AST including a plurality of defect nodes that correspond to one or more fault locations of the defective software program, the plurality of defect nodes including a first edit node that is changed by the first edit operation and including a second edit node that is changed by the second edit operation;

classifying a first particular node of the plurality of defect nodes as a first primary node that operates as a first starting point in implementing the first edit operation;

classifying a second particular node of the plurality of defect nodes as a second primary node that operates as a second starting point in implementing the second edit operation obtaining a visitor AST, wherein the visitor AST includes:
  each node in the defect AST;
  one or more first visitor edges that indicate a first programmatic relationship between the first edit node and the first primary node; and
  one or more second visitor edges that indicate a second programmatic relationship between the second edit node and the second primary node;

identifying a first visitor path from the first primary node to the first edit node in the visitor AST that includes a first sequence of the one or more first visitor edges;

identifying a second visitor path from the second primary node to the second edit node in the visitor AST that includes a second sequence of the one or more second visitor edges;

generating one or more fix patterns based on the first visitor path, the second visitor path, the first edit operation, and the second edit operation; and performing repair operations with respect to an identified fault of code under test of an analyzed software program using the one or more fix patterns.

13. The system of claim 12, wherein the plurality of defect nodes includes a third edit node that is changed by the first edit operation, and the operations further comprise, identifying a third visitor path from the first primary node to the third edit node, wherein the one or more fix patterns are is further based on the third visitor path.

14. The system of claim 13, wherein the operations further comprise identifying the first visitor path and the third visitor path as being common visitor paths with respect to each other based on the first visitor path and the third visitor path having a same sequence of visitor edges that are of the same type, and the generating of the one or more fix patterns is based on the first visitor path and the third visitor path being identified as being common visitor paths.

15. The system of claim 12, wherein the operations further comprise selecting the first visitor path for use in generating the one or more fix patterns based on the first visitor path having a fewest number of visitor edges as compared to other visitor paths associated with the first fault or other faults of the defective software program.

16. The system of claim 12, wherein classifying the first particular node of the plurality of defect nodes as the first primary node comprises:
  obtaining a plurality of test defective software programs that includes a plurality of faults that are similar to the first fault of the defective software program; and
  identifying a plurality of common fault attributes of at least a portion of the plurality of faults in the plurality of test defective software programs, wherein the first particular node of the plurality of defect nodes is classified as the first primary node based on the first particular node including one or more of the plurality of common fault attributes of the portion of the plurality of faults in the plurality of test defective software programs.

17. The system of claim 12, wherein the one or more fix patterns are generated in a format compatible with a source code of the defective software program.

* * * * *